US012330183B2

(12) United States Patent
Reddy et al.

(10) Patent No.: US 12,330,183 B2
(45) Date of Patent: Jun. 17, 2025

(54) ROLL COATING USING METERED COATING ROLL INCLUDING DEFORMABLE LAYERS

(71) Applicant: 3M INNOVATIVE PROPERTIES COMPANY, St. Paul, MN (US)

(72) Inventors: Kevin T. Reddy, Minneapolis, MN (US); Scott L. Ciliske, St. Paul, MN (US); Shawn C. Dodds, St. Paul, MN (US); Mikhail L. Pekurovsky, Bloomington, MN (US); Kara A. Meyers, Oakdale, MN (US); James N. Dobbs, Woodbury, MN (US); Samad Javid, Woodbury, MN (US); Robert B. Secor, Stillwater, MN (US); Joseph B. Farley, New Brighton, MN (US); Ronald P. Swanson, Woodbury, MN (US); Tyler J. Rattray, Woodbury, MN (US); Ann M. Gilman, Bayport, MN (US); Angela S. McLean, Woodbury, MN (US); Thomas A. Mahler, Osceola, WI (US); Yugeun P. Yang, North St. Paul, MN (US); Paul J. Cordes, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 17 days.

(21) Appl. No.: 18/259,222

(22) PCT Filed: Dec. 21, 2021

(86) PCT No.: PCT/IB2021/062101

§ 371 (c)(1),
(2) Date: Jun. 23, 2023

(87) PCT Pub. No.: WO2022/144692

PCT Pub. Date: Jul. 7, 2022

(65) Prior Publication Data

US 2024/0050973 A1 Feb. 15, 2024

Related U.S. Application Data

(60) Provisional application No. 63/132,141, filed on Dec. 30, 2020.

(51) Int. Cl.
*B05C 1/16* (2006.01)
*B05C 1/08* (2006.01)
*B05D 1/40* (2006.01)

(52) U.S. Cl.
CPC ............ *B05C 1/165* (2013.01); *B05C 1/0808* (2013.01); *B05C 1/083* (2013.01); *B05C 1/0834* (2013.01); *B05D 1/40* (2013.01)

(58) Field of Classification Search
None
See application file for complete search history.

(56) References Cited

U.S. PATENT DOCUMENTS 3,647,525 A * 3/1972 Dahlgren .............. B05C 1/0821 427/428.15
3,701,335 A 10/1972 Barnscheidt
(Continued)

FOREIGN PATENT DOCUMENTS

GB 1038906 A * 8/1966 ............ B31F 1/2818
WO WO-2019102295 A1 * 5/2019 ........... B05C 1/0808
(Continued)

OTHER PUBLICATIONS

Hannecard "Hardness Specifications for Roller Covering" (2017). Retrieved from https://www.hannecard.fr/ (Year: 2017).*
(Continued)

*Primary Examiner* — Jose I Hernandez-Kenney

(57) ABSTRACT

Methods and apparatuses for roll coating are provided. The roll coating system (100) includes a coating roll (110)
(Continued)

having a deformable inner layer (12) with a surface thereof covered by a deformable outer layer (14), the inner layer being softer than the outer layer. A substrate (3) is conveyed to the nip (12) between the coating roll and a back-up roll (120). A metered coating material is transferred from the coating roll to a patterned surface structure (40) of the substrate at the nip to form a conformal coating on the patterned structure of the substrate.

5 Claims, 8 Drawing Sheets

(56) References Cited

U.S. PATENT DOCUMENTS 3,867,225 A * 2/1975 Nystrand ............... D21H 27/40 156/219
5,206,992 A 5/1993 Carlson et al.
5,833,804 A * 11/1998 Ruppel ..................... B31F 1/07 156/578
6,977,011 B2 12/2005 Kustermann et al.
2004/0069219 A1* 4/2004 Kustermann ........... F16C 13/00 118/200
2018/0133742 A1 5/2018 Dodds et al.

FOREIGN PATENT DOCUMENTS

WO 2020079571 A1 4/2020
WO 2020121121 A1 6/2020
WO 2021198825 A1 10/2021

OTHER PUBLICATIONS

International Search report for PCT International Application No. PCT/IB2021/062101, mailed on Mar. 28, 2022, 5 pages.

* cited by examiner

ROLL COATING USING METERED COATING ROLL INCLUDING DEFORMABLE LAYERS

CROSS REFERENCE TO RELATED APPLICATIONS

This application is a national stage filing under 35 U.S.C. 371 of PCT/IB2021/062101, filed 21 Dec. 2021, which claims the benefit of U.S. Application No. 63/132,141, filed 30 Dec. 2020, the disclosure of which is incorporated by reference in its/their entirety herein.

BACKGROUND

Coating rolls including a rubber layer covering a rigid core have been widely used to apply coating materials onto substrates.

SUMMARY

There is a desire to control coating coverage and/or uniformity on a patterned surface structure of a substrate. Briefly, in one aspect, the disclosure describes a method of coating a patterned structure on a substrate. The method includes providing a coating roll having a deformable inner layer with a surface thereof covered by a deformable outer layer, the inner layer being softer than the outer layer. The method further includes providing a back-up roll engaging the coating roll to form a nip therebetween, and providing a substrate to enter the nip and wrap around the back-up roll. The substrate includes a patterned surface structure, the patterned surface structure including an array of structures having peaks projecting from a base plane of the substrate and troughs formed between the adjacent structures. The method further includes transferring a coating material from the coating roll to the substrate at the nip to form a coating pattern covering the peaks of the patterned surface structure of the substrate.

In another aspect, this disclosure describes a roll coating system including a coating roll having a deformable inner layer with a surface thereof covered by a deformable outer layer, the inner layer being softer than the outer layer; a back-up roll engaging the coating roll to form a nip therebetween; a substrate to enter the nip and wrap around the back-up roll, the substrate including a patterned surface structure, the patterned surface structure including an array of structures having peaks projecting from a base plane of the substrate and troughs formed between the adjacent structures; an applicator to engage with the coating roll to provide a coating material thereon; and a metering mechanism adjacent to the coating roll to control the thickness of the coating material on the coating roll to be transferred to the patterned surface structure of the substrate. The coating material is transferred from the coating roll to the substrate at the nip to form a coating pattern covering the peaks of the patterned surface structure of the substrate.

Various unexpected results and advantages are obtained in exemplary embodiments of the disclosure. One such advantage of exemplary embodiments of the present disclosure is that the deformable coating roll can be used to conformally coat over upper surfaces or peaks of a patterned surface structure of a substrate, without applying a coating into troughs between the peaks, which provides a larger process window and better control over coverage and/or uniformity to the original patterned surface structure. In addition, the engagement depth between the coating roll and the reverse metering roll can be controlled to adjust a thickness of the coating material on the coating roll to be transferred to the patterned surface structure of the substrate at the nip.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying drawings, in which:

FIG. 1 is a schematic diagram of a roll coating system, according to one embodiment of this disclosure.

Figure 1:
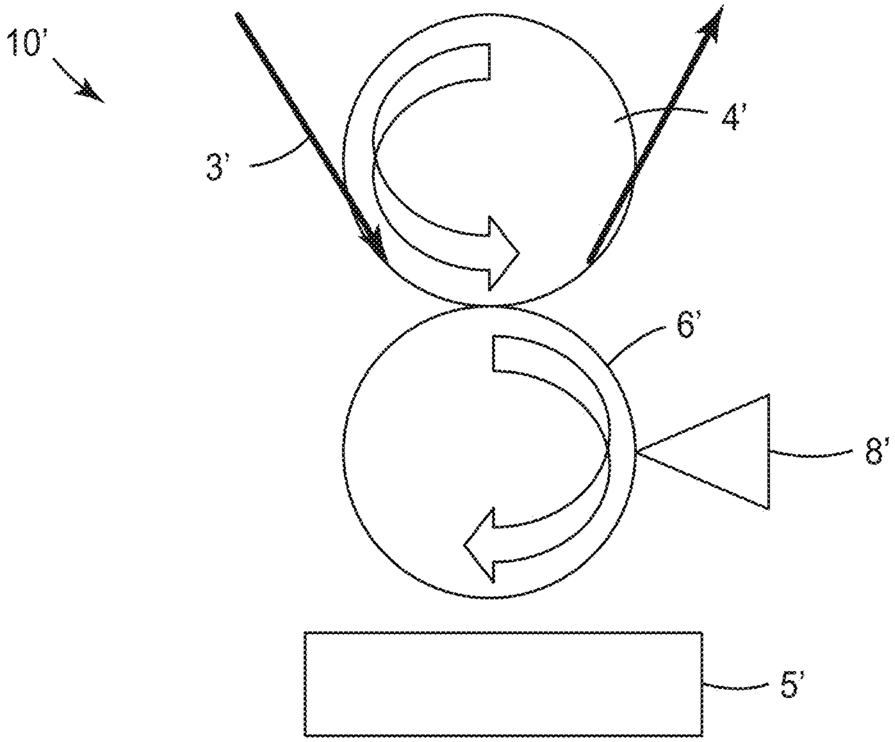
FIG. 1' Prior Art
FIG. 1' is a schematic diagram of a roll coating system.
Figure 1:
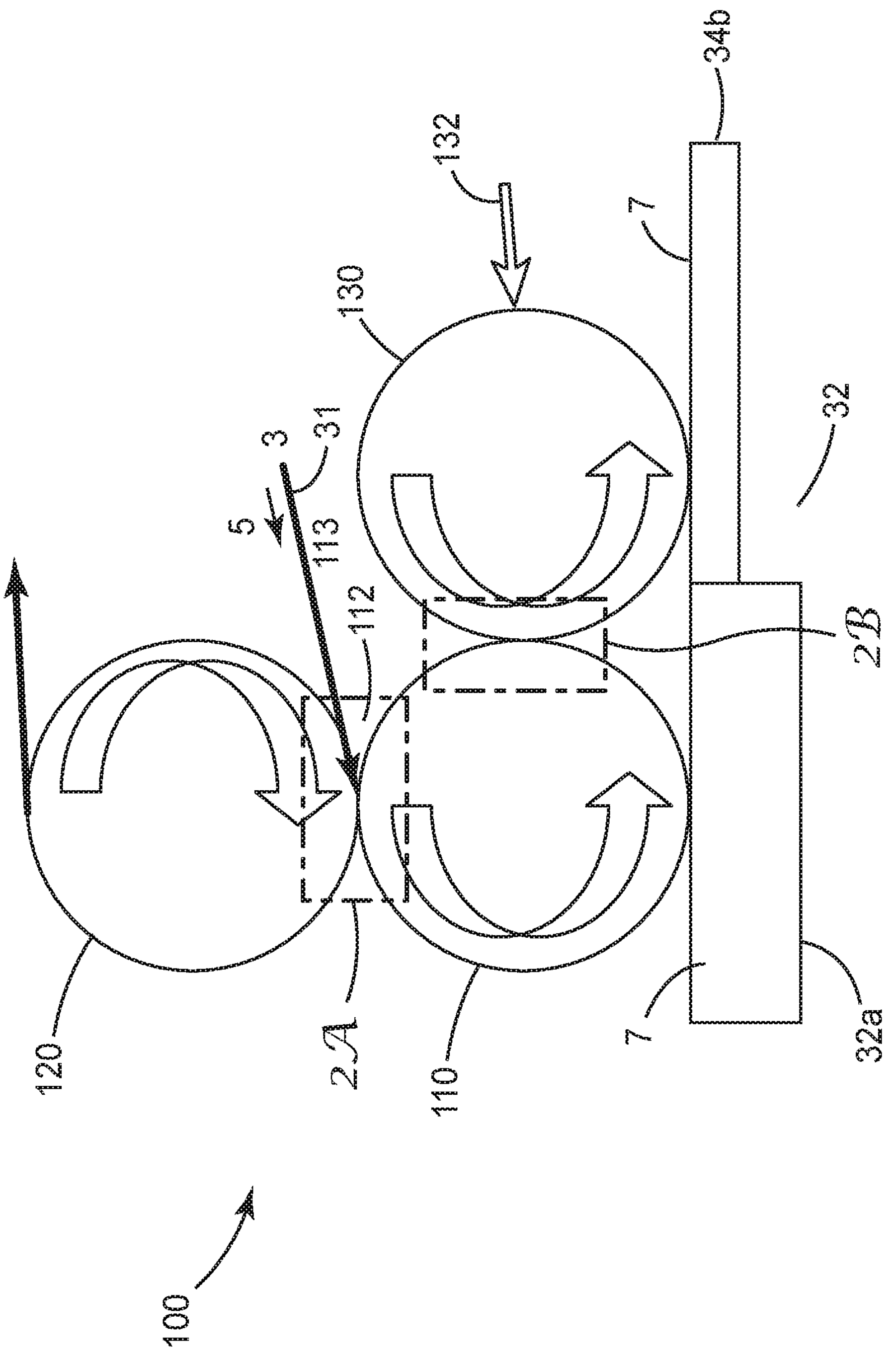

In the drawings, like reference numerals indicate like elements. While the above-identified drawings, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that:

In this application, the terms “compressible” or “incompressible” refers to a material property, i.e., compressibility, of an object (e.g., an elastomer outer layer) which is a measure of the relative volume change of the material in response to a pressure. For example, the term “substantially incompressible” refers to a material having a Poisson’s ratio greater than about 0.45.

The term “elastically deformable” means a deformed object (e.g., an inner layer of synthetic foam) being capable of substantially 100% (e.g., 99% or more, 99.5% or more, or 99.9% or more) recovering to its original, undeformed state when the load causing its deformation is removed from the object.

The terms "liquid," "liquid material," or "liquid coating material" refers to any materials flowable at coating operation conditions described herein.

In this application, the term "nip" refers to a system of two rolls with (i) a gap between adjacent first and second rolls where the distance between the centers of the first and second rolls is greater than or equal to the sum of the radii of the two rolls, or (ii) an impression engagement between adjacent first and second rolls when the distance between the center of the first and second rolls is less than the sum of the radii of the two rolls in undeformed state. A typical gap between two nip rolls might be, for example, from about 1 micrometer to about 1 mm, or about 10 micrometers to about 500 micrometers. The impression engagement may be as little as, for example, 1 micrometer, or could be as 10 much as can be obtained without damaging the printing equipment.

In this application, the term "self-metered" refers to a coating system where the thickness of the applied coating depends on the configuration of the coating system (for example, in a roll coating system, the durometer of any rubber covered rolls or the gap between the rolls), and cannot be independently varied (for example by adjusting a pump rate). Typical self-metered coating systems might include roll coaters, gravure coaters, and notch bar coaters. Conversely, a "pre-metered" coating system is one in which the applied coating thickness is determined by variables outside the coating system, for example through the pump flowrate. Typical pre-metered coating systems might include die coaters, curtain coaters, and slide coaters. It should be noted that the same coating system may be operated in either pre-metered or self-metered modes. For example, a die coater, which is usually operated in a pre-metered mode might have its location relative to a back-up roll adjusted, generating weeping (fluid dripping out the upstream end of the die) and resulting in a thinner coating than would be expected based on the flowrate from the pump, and therefore resulting in a system that is no longer pre-metered.

In this application, the terms "polymer" or "polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

In this application, by using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate (e.g., web). However, unless otherwise indicated, it is not intended that the substrate (e.g., web) or articles should have any particular orientation in space during or after manufacture.

In this application, by using the term "overcoated" to describe the position of a layer with respect to a substrate (e.g., web) or other element of an article of the present disclosure, we refer to the layer as being atop the substrate (e.g., web) or other element, but not necessarily contiguous to either the substrate (e.g., web) or the other element.

In this application, the term "machine direction" refers to the direction in which the substrate or web travels. Similarly, the term "cross-web direction" refers to the direction perpendicular to the machine direction (i.e., substantially perpendicular to the direction of travel for the web), and in the plane of the top surface of the web.

In this application, the terms "about" or "approximately" with reference to a numerical value or a shape means +/− five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

In this application, the term "substantially" with reference to a property or characteristic means that the property or characteristic is exhibited to a greater extent than the opposite of that property or characteristic is exhibited. For example, a substrate (e.g., web) that is "substantially" transparent refers to a substrate (e.g., web) that transmits more radiation (e.g. visible light) than it fails to transmit (e.g. absorbs and reflects). Thus, a substrate (e.g., web) that transmits more than 50% of the visible light incident upon its surface is substantially transparent, but a substrate (e.g., web) that transmits 50% or less of the visible light incident upon its surface is not substantially transparent.

In this application, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this application, the recitation of numerical ranges by endpoints includes all numbers subsumed within that range (e.g. 1 to 5 includes 1, 1.5, 2, 2.75, 3, 3.8, 4, and 5).

Methods and apparatuses are described herein for roll coating systems and methods. In a roll coating process described herein, a flexible web is disposed between a back-up roll and a coating roll which engage with each other to form a nip therebetween. The coating roll has a deformable inner layer with a surface thereof covered by a deformable outer layer. The inner layer may be softer than the outer layer. A metered coating material is transferred from the coating roll to the major surface of the substrate at the nip to form a coating pattern on the patterned structure on the major surface of the substrate.

FIG. 1' illustrates a conventional forward two-roll coating system 10'. The back-up roll 4' and the coating roll 6' are engaged to form a nip. One of the roll 4' and the roll 6' is a rigid roll, and the other is a rigid roll with a rubber cover. In some cases, both rolls 4' and 6' could be either rigid rolls or rigid rolls with rubber covers. A flexible substrate 3' enters the nip and wraps around the back-up roll 4'. A coating solution is applied to the coating roll 6' via a pan 5' which is filled with the coating solution. The coating roll 6' is dipped into the pan, such that the coating solution is applied to the coating roll 6' as a portion of its surface rotates out of the pan 5'. The coating solution then is carried by the coating roll 6' directly into the nip with backup roll 4'. In this configuration, since the amount of fluid withdrawn from the pan 5' is not controlled, and is typically quite significant, the coating system would be described as self-metered, with the nip between rolls 4' and 6' rejecting any fluid in excess of the amount permitted by the nip for a given set of operating conditions (for a discussion of metering in roll coating systems see, for example, Marcio Carvalho, Roll Coating Flows in Rigid and Deformable Gaps, PhD Thesis, 1996, University of Minnesota). When the substrate 3' has a patterned surface structure or three-dimensional structures, in this configuration it may not be possible to control how the coating is applied to the structure. In other words, an excess of coating solution is supplied to the nip, and therefore the structure on the substrate will be flooded.

For some variations of the coating system 10' of FIG. 1', the thickness of the coating solution applied by roll 6' can be controlled using a metering mechanism 8', or the coating solution may be applied directly to roll 6' using the metering mechanism 8', with the coating solution carried from that point into the nip with backup roll 4'. Typical metering mechanisms include coating dies, flow bars, doctor blades, etc. By applying the fluid to the coating roll 6' using the metering mechanism 8', it may be possible to operate the nip between rolls 4' and 6' such that it is pre-metered, with no fluid rejected by the nip, though even in this case it may not be possible to control how the coating is applied to a substrate 3' that has a patterned structure or three-dimensional structures, as any nonuniformities in the surface of either roll may lead to local areas where fluid begins to accumulate and therefore locally floods the structure on the substrate.

Methods and apparatuses are described herein for roll coating methods and systems which can address the above described issues. In some embodiments of the present disclosure, a deformable coating roll can be used. The coating roll includes a deformable inner layer with a surface thereof covered by a deformable outer layer, where the inner layer is softer than the outer layer. The deformable coating roll described herein can be used to conformally coat the peaks of a patterned surface structure of a substrate, providing a larger process window and better control over coverage and/or uniformity to the original patterned surface structure than a traditional rubber roll such as in the conventional coating system 10' of FIG. 1'.

The traditional roll coating system such as the system of FIG. 1' may pick up large amounts of material that isn't metered until the coating nip where a rolling bank is formed. This rolling bank may flood the whole structure or through openings on a patterned surface structure of the substrate, which can be prevented via a pre-metering approach in this disclosure. The traditional system also uses a traditional rubber roll which creates more pressure at the nip compared to a coating roll described herein and forces the material, even if it is pre-metered, deeper into the patterned surface structure or through openings in the substrate at the same engagement of the substrate. In addition, in the traditional system, when a fixed surface such as a blade or coating die is used to pre-meter the coating solution onto the coating roll, any particles or aggregates present in the coating solution can easily get caught under the fixed surface and cause streaks. The use of a metering roll in the present disclosure can agitate the coating nip particles out of the nip to prevent streaks.

Some embodiments of the present disclosure further provide a metering roll to engage with the coating roll. The metering roll and the coating roll may spin in either the same or opposite directions. For example, when both roll can spin clockwise or both rolls can spin counterclockwise then the metering roll may be said to be running in reverse to the coating roll. When one of the metering and coating rolls spins clockwise and the other counterclockwise then the metering roll may be said to be running forward with the coating roll. It is to be understood that running the metering roll in reverse may generally be preferred, as it may be helpful to eliminate the ribbing defect and therefore produce more uniform coatings. The engagement depth and/or the relative roll speed between the coating roll and the metering roll can be controlled to adjust a thickness of the coating material on the coating roll to be transferred to the major surface of the substrate at the nip.

Figure 2A:
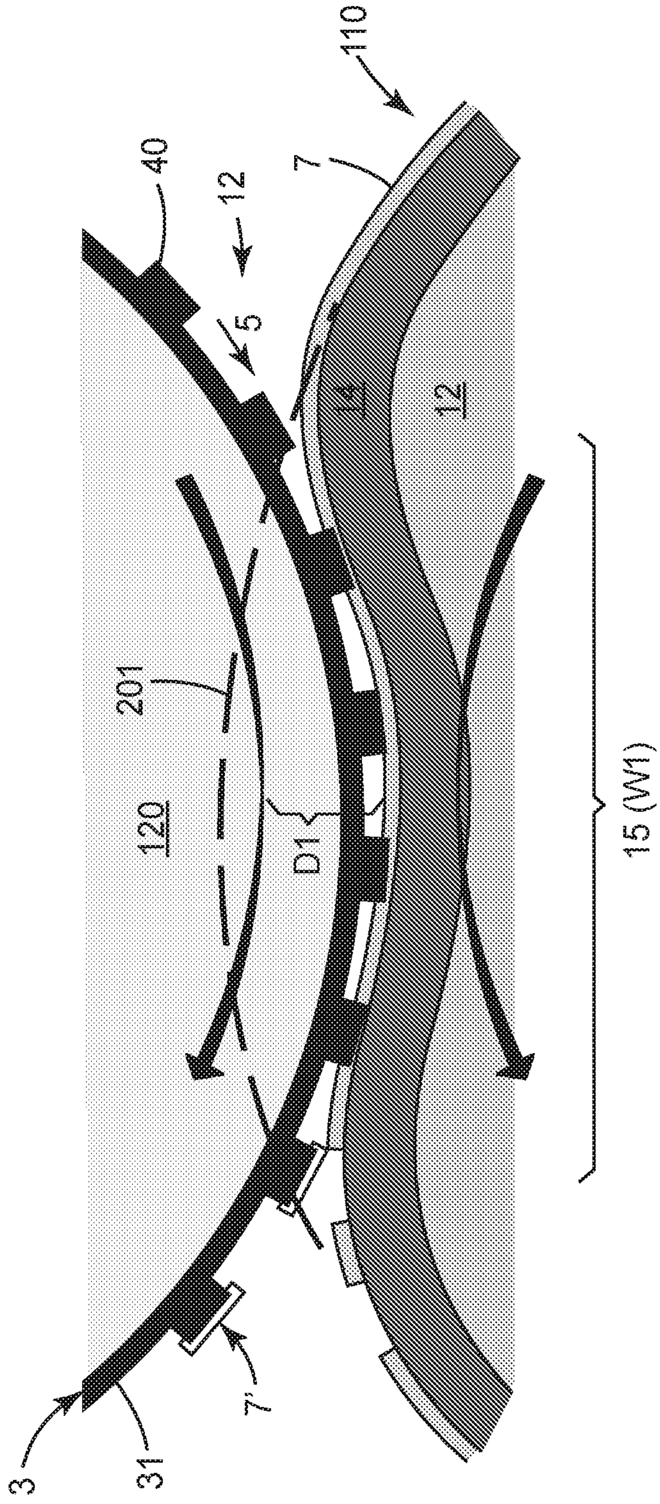
FIG. 2A is an enlarged view of a portion of FIG. 1.
Figure 2B:
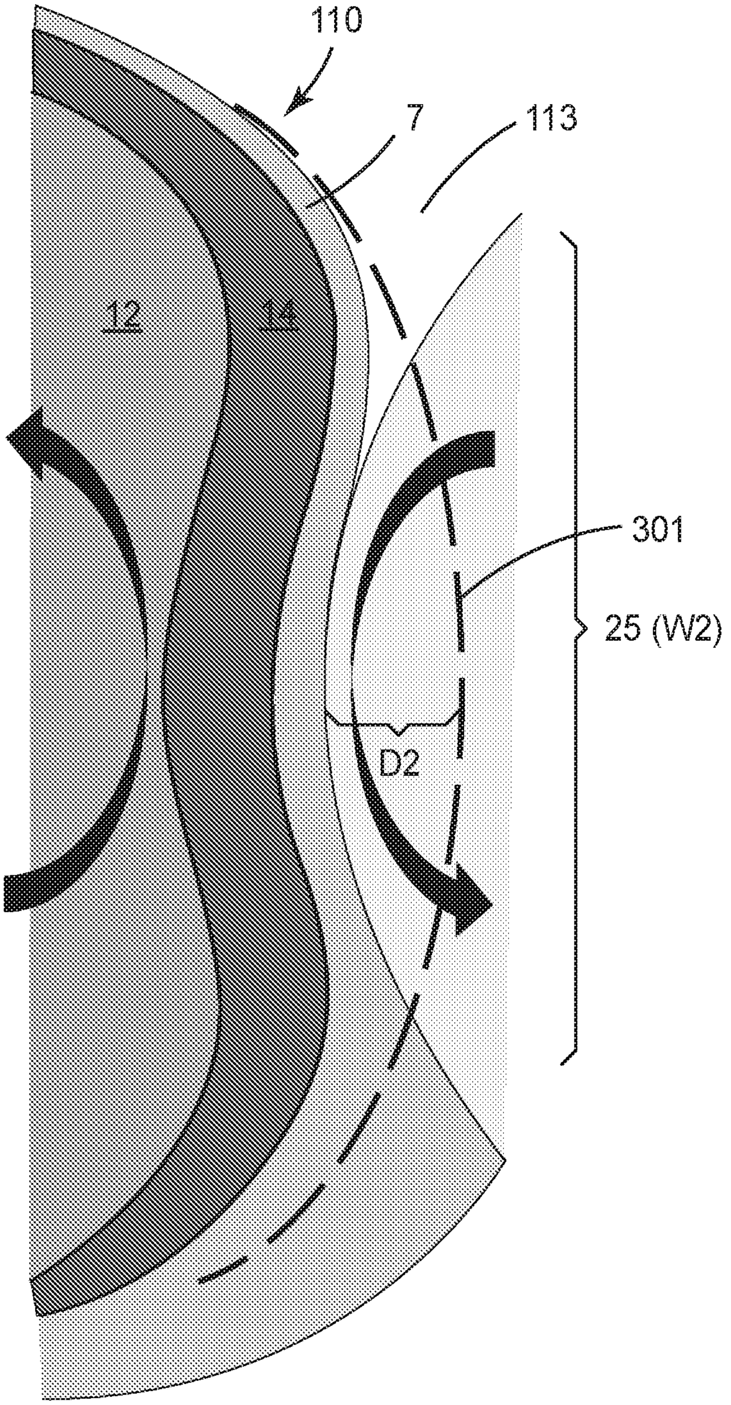
FIG. 2B is another enlarged view of another portion of FIG. 1.

It is found in this disclosure that when deformable coating rolls described here are used, the coating weight on a structured substrate surface is much less correlated to the engagement depth between the coating roll and the back-up roll (e.g., as shown as an engagement depth D1 in FIG. 2A) as compared to the engagement depth between the coating roll and the metering roll (e.g., as shown as an engagement depth D2 in FIG. 2B). This indicates that the nip between rolls 110 and 120 in FIG. 1 is effectively pre-metered. This can be technically beneficial because it allows for control of the coating weight via the engagement depth D2, while the engagement depth D1 can be used to control the conformability of the coating to the upper surfaces or peaks of the patterned surface structure of the substrate. The embodiments of the present disclosure provide an effective way to decouple the factors related to a coating thickness and a pressure between the coating roll and the back-up roll. The soft inner layer in the coating roll of this disclosure when covered by a deformable outer layer, generates a significantly reduced nip force at the same engagement depth D1 as compared to a traditional rubber roll, allowing the coating solution to be applied only to the upper surfaces or peaks of the patterned surface structure of the substrate 3 without applying a coating into troughs, gaps, or openings between the peaks of the patterned surface structure.

Various exemplary embodiments of the disclosure will now be described with particular reference to the Drawings. Referring now to FIG. 1, a schematic diagram of a coating apparatus 100 for applying a liquid coating on a moving substrate via a three-roll coating system, according to some embodiments. FIGS. 2A-B illustrate enlarged portion views of the coating apparatus 100 in FIG. 1, according to some embodiments.

The coating apparatus 100 includes a coating roll 110, a back-up roll 120, and a metering roll 130. The coating roll 110 and the back-up roll 120 engage with each other to form a nip 112. FIG. 2A illustrate an enlarged portion view of the region at the nip 112 in FIG. 1. In the depicted embodiment, the back-up roll 120 is a rigid roll, for example, a metal roll made of a metal such as steel. A substrate 3 of indefinite length material is conveyed in a machine direction 5 into the nip 112 and wraps around the back-up roll 120, with its major surface 31 facing to the coating roll 110. It is to be understood that the substrate 3 may not be limited to the specific wrap angles as it enters/exits the nip 112 shown schematically in FIG. 1. Also, the relative position of the back-up roll 120 compared to the coating roll 110 may not be limited to what is depicted in FIG. 1.

The substrate 3 can include any suitable flexible substrate, such as, for example, a polymer web, a paper, a polymer-coated paper, a release liner, an adhesive coated web, a flexible metallic foil, a metal coated web, a flexible glass or ceramic web, a nonwoven, a woven, a fabric, or any combinations thereof. The substrate 3 is disposed between the back-up roll 120 and the coating roll 110, wrapping around the back-up roll 120 with various wrap angles. In some embodiments, the substrate 3 can wrap the back-up roll 120 with a wrap angle in the range, for example, from about 1 to about 180 degrees, about 1 to about 120 degrees, about 1 to about 90 degrees, or about 1 to about 60 degrees.

The substrate 3 has a patterned surface structure on its major surface 31 facing to the coating roll 110. In some embodiments, the patterned surface structure on the major surface 31 of the substrate 3 may include an array of structures each having a characteristic height as measured between an upper surface and a lower surface thereof. The characteristic height may be in a range, for example, about 10 to about 500 micrometers. The upper surfaces of the structures may have an average width in the range, for example, about 100 micrometers to about 10 mm. The coating material can be coated conformally to the upper surfaces of the structures, without substantially coating into the gaps, openings, valleys, or troughs between the structures.

Figure 3A:
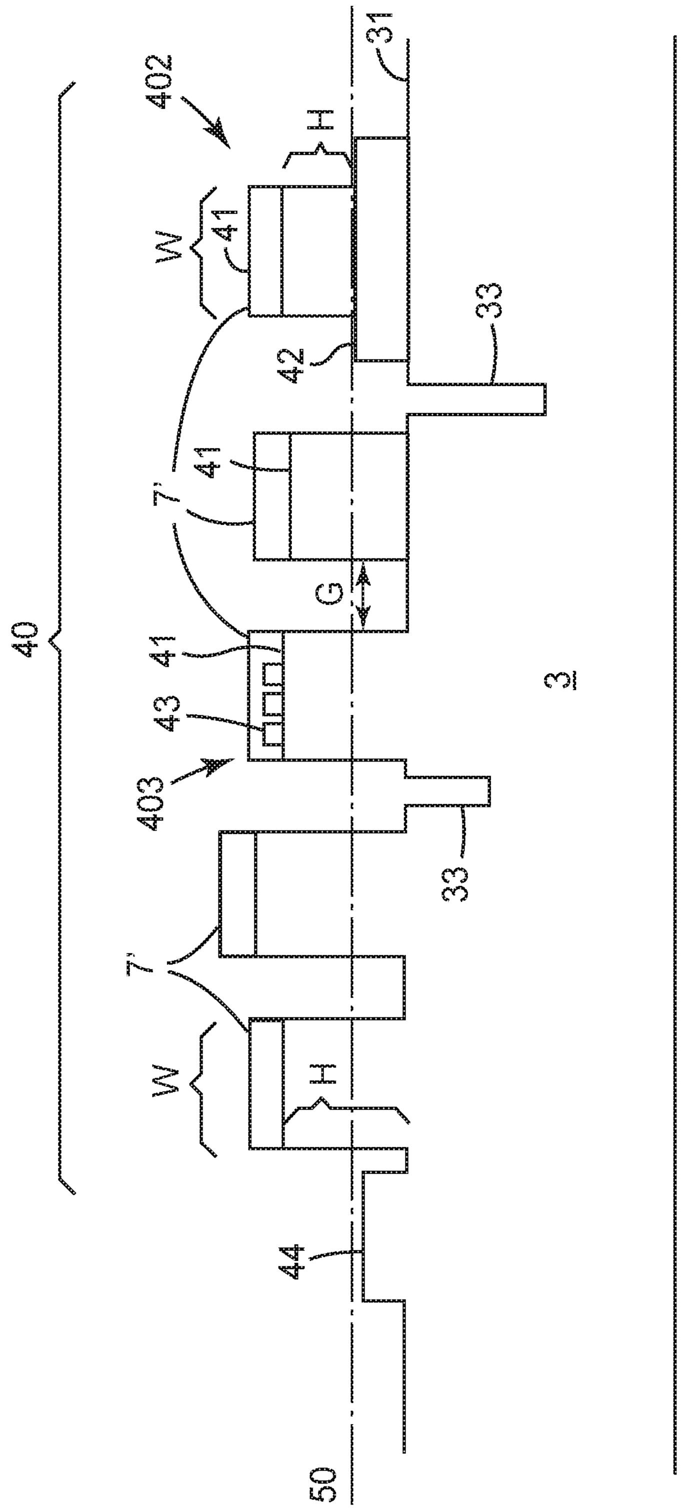
FIG. 3A is a schematic diagram showing a coating pattern on a patterned surface structure of a substrate.
Figure 3B:
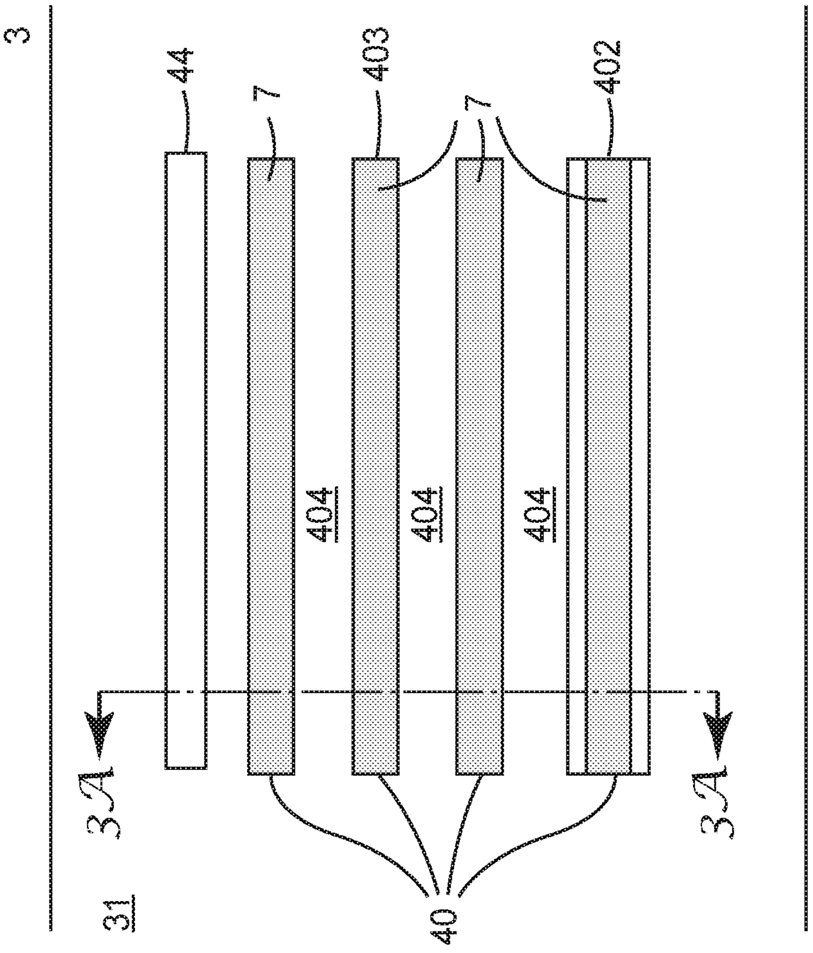
FIG. 3B is a plan view of the coating pattern of FIG. 3A.

One exemplary patterned surface structure of a substrate is illustrated in FIGS. 3A and 3B. The patterned surface structure includes an array of structures 40 on or of the major surface 31 of the substrate 3. Some of the structures 40 can be an original pattern of the major surface 31 of the substrate 3. The structures 40 can be from the inherent structure of a substrate itself, including a nonwoven, woven, or knit, and can be random or non-random. The substrate 3 and its major surface 31 can be porous or contain openings (e.g., openings or pores 33 in FIG. 3A). The openings can be inherent from the manufacturing process or can be deliberately formed by mechanical or other means. The structures 40 of the substrate 3 can also vary in the "z-direction" or through direction of substrate 3. The substrate through direction can be composed of varying porous layers, non-porous layers, or combinations of the two. A coating depth or plane can be defined through the substrate 3.

Some of the structures 40 can also be formed on the major surface 31 of the substrate 3 which may already have an original pattern. The structures 40 can be formed on the substrate 3 by various methods such as, for example, screen printing, etching, microreplication, laser engraving, embossing, coating, dispensing, etc. The structures 40 can be made of the same material as the major surface 31 of the substrate 3. The structures 40 may also include different materials than that of the major surface 31 of the substrate 3.

The structures 40 can include various materials such as, for example, acrylates, silicones, epoxies, urethanes, olephins, UV cureable polymers, thermally cureable polymers, mineral films, coatings, and/or particles, metallic films, coatings, and/or particles, ceramic films, coatings, and/or particles, inorganic films, coatings, and/or particles, or any combination thereof.

The array of structures 40 may have various cross-sectional shapes such as, for example, round shapes, oval shapes, rectangular shapes, or irregular shapes. The array of structures 40 may form various patterns on the major surface 31 of the substrate 3. For example, in the embodiment depicted in FIG. 3B, the structures 40 form a line pattern, where the adjacent structures 40 may be separated with openings, gaps, or troughs 404. It is to be understood that when the substrate 3 itself is porous or contains openings, the gaps 404 may pass at least partially into or all the way through the substrate 3. The width of the gaps 404 may be measured by a distance between adjacent peaks 41. The width of the gaps 404 may be in the same order of the average width of the upper surfaces 41, in the range, for example, about 100 micrometers to about 10 mm.

Each of the structures 40 may have an upper surface or a peak 41, which projects from a base plane 50 of the substrate 3. The base plane 50 of the substrate 3 is defined as a surface at or below which the coating material 7 is not substantially applied. In other words, the coating material 7 is substantially applied to the major surface 31 of the substrate 3 including the structure which projects above the base plane 50, and the coating is not substantially applied to any portion of the substrate 3 and/or the structure 40 which is at or below the base plane 50. For example, the structure 44 on the major surface 31 of the substrate 3 is below the base plane 50 and the coating may not be applied onto the structure 44. The base plane 50 may correspond to a physical surface. For example, when the substrate 3 is substantially flat and non-porous, the base plane 50 may correspond to its major surface 31. The base plane 50 may also correspond to a location in space. For example, with a uniform grid of structures 40, the base plane 50 may be located halfway between the upper and lower surfaces of the structure 40. The base plane 50 may also lie below the major surface 31 of the substrate. For example, in a nonuniform and porous material, the coating 7 may be applied to the highest portions of major surface 31, without being applied to the lower portions of the major surface 31, or may not penetrate through the pores to contact the back surface of substrate 3.

The structures 40 are separated from each other via the gaps, openings, or troughs 404 therebetween. The upper surface or peak 41 may have a planar or non-planar shape (e.g., a curved surface). The structures 40 may include hierarchical multi-scale structures. One exemplary multi-scale structure is shown as 402, where the characteristic height H is measured as the distance between the upper surface or peak 41 and a lower surface 42 thereof. Another exemplary multi-scale structure is shown as 403, where an array of sub-scale structures 43 are formed on the upper surface or peak 41 thereof.

A coating pattern 7' is formed on the structures 40 by transferring a coating material 7 substantially conformally onto the upper surfaces or peaks 41 of the structures 40. The coating pattern 7' follows the surface profile of the structures 40 and substantially and uniformly covers the upper surfaces 41. For example, the coating pattern 7' can substantially cover the array of sub-scale structures 43 formed on the upper surface or peak 41 of the hierarchical multi-scale structure 403. In some embodiments, the coating pattern 7' may cover the upper surfaces or peaks of the sub-scale structures 43 and may not fill in the gaps between the sub-scale structures 43. When transferring the coating material 7 from the coating roll 110 to the substrate 3, the process is controlled such that the coating material 7 may not coat into the gaps, openings, or troughs 404 between the adjacent structures 40.

Referring again to FIG. 1, the coating material 7 is provided, via an applicator 32, onto the coating roll 110. A metering mechanism including a reverse metering roll 130 is disposed adjacent to the coating roll to meter the coating material on the coating roll 110 to be transferred to the major surface of the substrate at the nip 112. The reverse metering roll 130 can be a rigid roll, for example, a steel roll, or a rigid roll with a rubber cover. In the depicted embodiment of FIG. 1, the applicator 32 includes a catch pan which includes a first part **32*a* to provide the coating material 7 onto the coating roll 110 and a second part 34*b* positioned underneath the metering roll 130. A doctor blade 132 is provided to remove the excess coating material from the metering roll 130, ensuring that as the metering roll 130 rotates back into the nip 113 formed by the rolls 110 and 130, the metering roll can be substantially free of any coating solution, ensuring a smooth coating layer 7 on the coating roll 110**.

The reverse metering roll 130 and the coating roll 110 rotate in a same direction (e.g., both counterclockwise in FIG. 1), while the back-up roll 120 rotates in the opposite direction (e.g., clockwise as depicted in FIG. 1). In the depicted embodiment, the rolls 110, 120 and 130 are positioned such that the nip 113 formed by the rolls 110 and 130 is downstream of the first part 32*a* of the catch pan, and upstream of the nip 112 formed by the rolls 110 and 120. In some embodiments, instead of using a catch pan, the applicator 32 can provide the coating material to form a rolling bank at a nip formed by the rolls 110 and 130.

While a reverse metering roll 130 is provided as the metering mechanism in the embodiment of FIG. 1, it is to be understood that other suitable metering mechanism can be used to control the fluid thickness on the coating roll 110. Suitable metering mechanisms may include, for example, coating dies, flow bars, doctor blades, etc.

The coating material 7 can be any coatable material including, for example, water- or solvent-based solutions, thermally curable solutions, radiation curable solutions primers, adhesives, inks, dispersions, emulsions, etc. The coating material may be Newtonian or non-Newtonian. In some embodiments, the coating solution may have a shear-sensitive viscosity or may shear thin and have a viscosity below about 100,000 centipoise (cPs), optionally below about 1,000 cPs. For example, a typical fluid may have a viscosity of about 10,000 cPs at a shear rate of 10 l/s and a viscosity of about 3,000 cPs at a shear rate of 2,000 l/s. The wet coating on the substrate can be dried, cured, or solidified to form a coating pattern on the substrate.

The coating roll 110 has a deformable inner layer 12 with a surface thereof covered by an outer layer 14. The inner and outer layers 12, 14 may be permanently bonded together in some embodiments and may not be permanently bonded together in other embodiments. It is to be understood that the "outer layer" does not necessarily mean an outermost layer; and the "inner layer" does not necessarily mean an innermost layer. The outer layer 14 has a substantially uniform thickness about the periphery of the inner layer 12. The deformable inner layer 12 is mounted onto a rigid central core 11 (e.g., a metal core, a fiberglass core, a fiberglass shell mounted on a metal core, etc.) with a substantially uniform thickness about the periphery of the rigid central core 11. In some embodiments, the thickness ratio between the deformable inner layer 12 and the outer layer 14 can be about 3:1 or greater, about 5:1 or greater, about 7:1 or greater, or about 10:1 or greater. In some embodiments, the outer layer 14 has a thickness in the range from about 0.005" to about 0.300", optionally from about 0.005" to about 0.120". As used herein, 1" equals to 2.54 cm. In some embodiments, the deformable inner layer 12 has a thickness in the range from about 0.125" to about 3", optionally from about 0.4" to about 1.0". In some embodiments, compressible rollers described in U.S. Pat. No. 5,206,992 can be used to make the coating roll herein.

In some embodiments, the material used for the inner layer 12 can be softer than the material used for the outer layer 14. That is, an identical compressive force applied to an identically sized block of each material can result in a larger deformation in the direction of applied force with the softer material than with the harder material. This softness may be provided in several ways, for example by choosing a material with a lower hardness (as indicated using any appropriate hardness scale, such as Shore A or Shore OO), by choosing a material with a lower elastic modulus, by choosing a material with a higher compressibility (typically quantified via a material's Poisson's ratio), or by modifying the structure of the softer material to contain a plurality of gas inclusions, such as a foam or an engraved structure, etc. For example, when the outer layer 14 includes a material having a hardness of 60 Shore A (as measured using ASTM D2240), then the hardness of the inner layer 12 may be less than 60 Shore A. It should be noted that in some cases the hardness may be most appropriately measured using different scales for the inner and outer layers (e.g., Shore A durometer for the outer layer and Shore OO for the inner layer). In some embodiments, the compressibility of the inner layer 12 may be measured via Compression Force Deflection Testing per ASTM D3574 when the inner layer is foam; and via Compression-Deflection Testing per ASTM D1056 when the inner layer is a flexible cellular material such as, for example, sponge or expandable rubber. The inner layer 12 may have a compressibility, for example, less than about 45 psi at 25% deflection, optionally less than about 20 psi at 25% deflection. As used herein, 1 psi equals to 6.89 kPa. The inner layer of the coating roll may have a Poisson's ratio, for example, less than 0.3, less than 0.2, or less than 0.1.

In some embodiments, the outer layer 14 can be made of material(s) that are substantially incompressible, e.g., the relative volume change of the material in response to a contact pressure is less than 5%, less than 2%, less than 1%, less than 0.5%, or less than 0.2%. The inner layer 12 is configured to be elastically deformable, e.g., being capable of substantially 100% (e.g., 99% or more, 99.5% or more, or 99.9% or more) recovering to its original state after being deformed. In some embodiments, the inner layer 12 can be compressible to provide the desired deformability. In some embodiments, the inner layer 12 may be substantially incompressible, but sufficiently soft to provide the desired deformability. In some embodiments, the inner layer 12 may be a layer made of substantially incompressible material which has been patterned, 3D printed, embossed, or engraved to provide the desired deformability.

In some embodiments, the deformable inner layer of the coating roll has a hardness less than that of the deformable outer layer of the coating roll. In some embodiments, the hardness of the deformable outer layer 14 can be greater than about 40 Shore A, optionally greater than about 50 Shore A. In some embodiments, the hardness of the deformable inner layer 12 can be, for example, less than about 40 Shore A, less than about 20 Shore A, optionally less than about 10 Shore A.

In some embodiments, the inner layer 12 may have a higher compressibility than the outer layer 14. In some embodiments, the outer layer 14 can have a Poisson's ratio greater than about 0.1, greater than about 0.2, greater than about 0.3, or preferably greater than about 0.4. In some embodiments, the deformable inner layer 12 can have a Poisson's ratio less than about 0.5, less than about 0.4, less than about 0.3, or preferably less than about 0.2. In some embodiments, the deformable inner layer 12 can have a negative Poisson's ratio.

In some embodiments, the deformable outer layer 14 can include one or more materials of an elastomer, a metal, a fabric, or a nonwoven. In some embodiments, the outer layer 14 can be a substantially incompressible elastomer having a hardness greater than about 40 Shore A, or optionally greater than about 50 Shore A. The thickness of the outer layer 14 of the coating roll 110 can be less than about 10 mm, less than about 5 mm, or less than about 2 mm. Suitable elastomers may include thermoset elastomers such as, for example, Nitriles, fluoroelastomers, chloroprenes, epichlorohydrins, silicones, urethanes, polyacrylates, EPDM (ethylene propylene diene monomer) rubbers, SBR (styrene-butadiene rubber), butyl rubbers, nylon, polystyrene, polyethylene, polypropylene, polyester, polyurethane, etc.

In some embodiments, the deformable inner layer 12 can include one or more materials of a foam, an engraved, structured, 3D printed, or embossed elastomer, a fabric or nonwoven layer, or a soft rubber. The inner layer 12 of the coating roll 110 can have a hardness, for example, less than about 40 Shore A, less than about 20 Shore A, or less than about 10 Shore A. A suitable foam can be open-celled or closed-celled, including, for example, synthetic or natural foams, thermoformed foams, polyurethanes, polyesters, polyethers, filled or grafted polyethers, viscoelastic foams, melamine foam, polyethylenes, cross-linked polyethylenes, polypropylenes, silicone, ionomeric foams, etc. The inner layer may also include foamed elastomers or vulcanized rubbers, including, for example, isoprene, neoprene, polybutadiene, polyisoprene, polychloroprene, nitrile rubbers, polyvinyl chloride and nitrile rubber, ethylene-propylene copolymers such as EPDM (ethylene propylene diene monomer), and butyl rubber (e.g., isobutylene-isoprene copolymer). A suitable foam inner layer 12 of the coating roll 110 can have a compressibility, for example, less than about 45 psi at 25% deflection, or less than about 20 psi at 25% deflection. The inner layer may have a Poisson's ratio, for example, less than 0.3, less than 0.2, or less than 0.1. It is to be understood that the inner layer 12 may include any suitable compressible structures such as, for example, springs, nonwovens, fabrics, air bladders, etc. In some embodiments, the inner layer 12 can be 3D printed to provide desired Poisson's ratio, compressibility, and elastic response.

The intrinsic mechanical properties of the coating roll 110 can be expressed as S-Factor which is governed by the thickness, modulus, Poisson's ratio or compressibility of the various layers covering a rigid core of a roll. The definition and determination of S-Factor for a roll are described in U.S. Patent Application No. 63/004,754, which is incorporated herein by reference. A coating roll in this disclosure can include such a resilient roll cover and have an S-Factor, averaged over a range of engagement D from about 0 to 1.0 mm, or from 0.05 to 1.0 mm, that is less than 15 ($10^6$•N/$m^{5/2}$) and preferably less than 10 ($10^6$•N/$m^{5/2}$). Furthermore, the coating roll can have a slope in the S-Factor vs. engagement curve, for engagement values greater than 0.2 mm, that is less than 5000 ($10^6$•N/$m^{7/2}$), preferably less than 500 ($10^6$•N/$m^{7/2}$) and most preferably less than 50 ($10^6$•N/$m^{7/2}$).

Referring to FIG. 2A, the back-up roll 120 and the coating roll 110 are pressed against each other with a footprint having an engagement depth D1 and a machine-direction width W1 as shown in FIG. 2A. The back-up roll 120 is a rigid roll which is significantly less deformable compared to the coating roll 110. In some embodiments, the back-up roll 120 and the coating roll 110 can be pressed against each other such that the outer surface of the back-up roll 120 at least partially surpasses the un-deformed surface 201 of the coating roll 110. In some embodiments, the back-up roll 120 and the coating roll 110 can be positioned such that the substrate 3 is just contacting the outer surface of coating roll 110 at the tangent point of the un-deformed surface 201. In some embodiments, the back-up roll 120 and the coating roll 110 can be positioned such that the substrate 3 surpasses the un-deformed surface 201 and the outer surface of back-up roll 120 does not surpass the un-deformed surface 201.

The substrate 3 is conveyed along a web path and fed into the nip 112. The back-up roll 120 can rotate about an axis thereof to transport the substrate 3 along the machine direction 5 and through the nip 112. The back-up roll 120 can be rotated using a motor, or can be rotated simply due to frictional contact with the substrate 3.

The substrate 3 at a contacting area 15 can impress into the deformable surface of the coating roll 110 with an engagement width W1 along the machine direction 5 and an engagement depth D1 along a radial direction of the coating roll 110. The deformation of the coating roll 110 is due to the pressure that builds upon the engagement of the coating roll 110 and the back-up roll 120 such that the coating roll 10 deflects to the engagement depth D1 in the contacting area 15. In some embodiments, the machine-direction engagement width W1 may be in a range, for example, from about 0.1 mm to about 50 mm, from about 0.1 mm to about 20 mm, or from about 0.1 mm to about 10 mm. In some embodiments, the engagement depth D1 can be within a range, for example, from about 0.01 mm to about 10 mm, from about 0.05 mm to about 5 mm, or from about 0.1 mm to about 1 mm. It is to be understood that the contacting area 15 may not be limited to the area or space between the coating roll 110 and the back-up roll 120 (i.e., there may be some distance after the back-up roll 120 in the machine direction before which the coating roll 110 recovers to its original shape). A contacting area might refer to an area where the surface of the coating roll 110 is deformed upon the engagement with the back-up roll 120.

In some embodiments, the coating roll 110 may not be perfectly cylindrical, with a departure from cylindricity quantified using a total indicated runout (TIR), which can be defined as the difference between the largest and smallest values of the radius on the roll. For example, a roll with a maximum radius of 150.100 mm in one location, and a minimum radius of 150.000 mm in another location, would have a TIR of 0.100 mm. When the coating roll engages a back-up roll and rotates, the nonuniformities in roll radius may translate through the coating bead formed between the back-up roll and the coating roll. The differences in radii can produce a difference in pressure within a coating (e.g., in a liquid phase), resulting in a nonuniform coating. The impact of this TIR can be diminished by increasing the softness of the coating roll (thereby making it easier to deform under fluid or mechanical pressure), though it is well known in industry that soft materials can be more difficult to machine into precise shapes. One of the benefits of the present disclosure is that the thin, outer layer 14 can present a harder surface, and so is more practical to machine, without sacrificing the overall softness of the coating roll construction. In some embodiments, the TIR of the coating roll 110 may be, for example, no greater than about 100 micrometers, or no greater than about 50 micrometers.

Referring again to FIG. 2A, the portion of substrate 3 at the contacting area 15 is impressed, via the back-up roll 120, into the face of the coating roll 110 with the engagement depth D1. The back-up roll 120 can apply a substantially uniform pressure at the contacting area across the substrate 3 such that the substrate 3 can spread evenly along the cross-web direction over the face of the coating roll 110. The coating material 7 is transferred from the coating roll 110 on the major surface 31 of the substrate 3 that contacts the coating roll 110 to form a coating pattern 7' on the structures 40 on the major surface 31 of the substrate. The substantially uniform pressure at the contacting area 15 is helpful to achieve a conformal coating on the structured substrate surface 31.

Referring again to FIGS. 3A-B, the coating pattern 7' of the coating material 7 is formed on the array of structures 40 on the major surface 31 of the substrate 3. The coating pattern 7' can be conformal to the upper surfaces 41 of the microstructures with a predetermined wet coating thickness. The wet coating thickness refers to the coated thickness on the structures 40 or the substrate surface 31 immediately after the substrate exits the nip 112 between the back-up roll 120 and the coating roll. After drying, curing, or solidification, the coating thickness can be reduced. That reduction of coating thickness is due to a loss of volatile materials during drying, and/or shrinkage of the polymer. Curing can be accomplished by, for example, exposure of the coating to elevated temperature, or actinic radiation. Actinic radiation can be, for example, in the UV spectrum.

In some embodiments, the engagement depth D1 between the back-up roll 120 and the coating roll 110, such as shown in FIG. 2A, can be adjusted to control the coating thickness, the coating coverage, and the conformability of the coating pattern 7' on the structures 40 on the major surface 31 of the substrate 3. The engagement depth D1 can be adjusted to be within a range, for example, from about 0.01 mm to about 2 mm, from about 0.05 mm to about 1.5 mm, from about 0.1 mm to about 1.0 mm, or from about 0.1 mm to about 0.5 mm. In some embodiments, the engagement depth D1 can be adjusted by positioning the back-up roll 120 and/or the coating roll 110. The relative position of the back-up roll 120 and the coating roll 110 can be adjusted using a mounting and positioning mechanism. The engagement depth D1 can be adjusted by positioning the back-up roll 120 and/or the coating roll 110 such that the outer surface of the back-up roll 120 intersects the curved plane defined by the surface of the coating roll 110 in its un-deformed state. The engagement depth D1 (defined as the displacement of the outer surface of the coating roll from its undeformed state) may be increased by the presence of the coating liquid and may not be set solely by the position of the rolls.

In some embodiments, as the coating roll 110 is rotated, variations in the surface uniformity (TIR) and mechanical properties of the coating roll may lead to variations in force in the coating bead. As the engagement depth D1 is increased, these variations in force may become small relative to the overall force experienced by the coating bead. This may lead to improvements in coating uniformity/conformability and stable coating operating windows. The coating pattern 7' on the structures 40 may generally follow the surface profile of the upper surfaces 41 to form a coating pattern on the substrate. The variance in the coating weight/thickness of the coating pattern on the substrate can be, for example, less than about 20%, less than about 10%, less than about 7%, or less than about 5%. It is to be noted that this is despite the coating roll having a TIR that is significant compared to the wet coating thickness. For example, the ratio of the TIR to the wet coating thickness may be up to 300%, up to 100%, up to 50%, or up to 25%.

Referring to FIG. 2B, the metering roll 130 and the coating roll 110 can be pressed against each other with a footprint 25 having an engagement depth D2 and an engagement width W2 at the nip 113 formed therebetween. The engagement depth D2 can be controlled to adjust the coating material thickness on the coating roll 110 to be transferred to the major surface 31 of the substrate 3. In some embodiments, the engagement depth D2 can be adjusted by positioning the metering roll 130 and/or the coating roll 110. The relative position of the metering roll 130 and the coating roll 110 can be adjusted using a mounting and positioning mechanism. The engagement depth D2 can be adjusted by positioning the metering roll 130 and/or the coating roll 110 such that the outer surface of the metering roll 130 intersects the curved plane defined by the surface of the coating roll 110 in its un-deformed state. The engagement depth D2 (defined as the displacement of the outer surface of the coating roll from its undeformed state) may be increased by the presence of the coating liquid and may not be set solely by the position of the rolls. Also, the relative roll speed at the nip 113 between the rolls 110 and 130 can be controlled to adjust the coating material thickness on the coating roll 110. In some embodiments, the engagement depth D2 can be within a range, for example, from about 0.01 mm to about 10 mm, from about 0.05 mm to about 5 mm, or from about 0.1 mm to about 1 mm. The wet thickness of coating material 7 on the coating roll 110 can be controlled within a range, for example, from 1.0 to 1000 micrometers.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the specification and more particularly the Listing of Exemplary Embodiments and the claims can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but are to be controlled by the limitations set forth in the claims and any equivalents thereof.

LISTING OF EXEMPLARY EMBODIMENTS

Exemplary embodiments are listed below. It is to be understood that any one of the embodiments 1-14 and 15-27 can be combined.

Embodiment 1 is a method of coating a patterned structure on a substrate, the method comprising:
- providing a coating roll having a deformable inner layer with a surface thereof covered by a deformable outer layer, the inner layer being softer than the outer layer;
- providing a back-up roll engaging the coating roll to form a nip therebetween;
- providing a substrate to enter the nip and wrap around the back-up roll, the substrate comprising a patterned surface structure, the patterned surface structure including an array of structures having peaks projecting from a base plane of the substrate and troughs formed between the adjacent structures; and
- transferring a coating material from the coating roll to the substrate at the nip to form a coating pattern covering the peaks of the patterned surface structure of the substrate.

Embodiment 2 is the method of embodiment 1, further comprising metering the coating material on the coating roll to be transferred to the major surface of the substrate at the nip.

Embodiment 3 is the method of embodiment 2, wherein metering the coating material comprises providing a reverse metering roll to engage with the coating roll, the reverse metering roll and the coating roll spinning in a same direction.

Embodiment 4 is the method of embodiment 3, further comprising controlling at least one of a relative roll speed and an engagement depth between the coating roll and the reverse metering roll to adjust a thickness of the coating material on the coating roll to be transferred to the major surface of the substrate at the nip.

Embodiment 5 is the method of any one of embodiments 1-4, further comprising controlling an engagement depth between the coating roll and the back-up roll to adjust at least one of a coating thickness, a coating conformability, or a coating coverage of the coating material on the major surface of the substrate.

Embodiment 6 is the method of any one of embodiments 1-5, wherein the array of structures has a characteristic height about 10 to about 500 micrometers, and the coating material is coated conformal to the peaks of the structures.

Embodiment 7 is the method of any one of embodiments 1-6, wherein the deformable inner layer of the coating roll has a hardness less than that of the deformable outer layer of the coating roll.

Embodiment 8 is the method of embodiment 7, wherein the deformable inner layer of the coating roll has a hardness less than 40 Shore A, less than 20 Shore A, optionally, less than 10 Shore A.

Embodiment 9 is the method of embodiment 7 or 8, wherein the deformable outer layer of the coating roll has a hardness greater than about 40 Shore A, optionally greater than about 50 Shore A.

Embodiment 10 is the method of any one of embodiments 1-9, wherein the inner layer of the coating roll has a compressibility of less than about 45 psi at 25% deflection, optionally less than about 20 psi at 25% deflection.

Embodiment 11 is the method of any one of embodiments 1-10, wherein the inner layer of the coating roll has a Poisson's ratio of less than 0.3, less than 0.2, and optionally less than 0.1.

Embodiment 12 is the method of any one of embodiments 1-11, wherein the deformable outer layer includes one or more materials of an elastomer, a metal, a fabric, or a nonwoven.

Embodiment 13 is the method of any one of embodiments 1-12, wherein the deformable inner layer includes one or more materials of a synthetic foam, an engraved, structured, 3D printed, or embossed elastomer, a fabric or nonwoven layer, a plurality of cavities filled with gas of a controlled pressure, or a soft rubber.

Embodiment 14 is the method of any one of embodiments 1-13, wherein the back-up roll is a rigid roll, or optionally, a rigid roll covered with a deformable layer.

Embodiment 15 is a roll coating system comprising:

a coating roll having a deformable inner layer with a surface thereof covered by a deformable outer layer, the inner layer being softer than the outer layer;

a back-up roll engaging the coating roll to form a nip therebetween;

a substrate to enter the nip and wrap around the back-up roll, the substrate comprising a patterned surface structure, the patterned surface structure including an array of structures having peaks projecting from a base plane of the substrate and troughs formed between the adjacent structures;

an applicator to engage with the coating roll to provide a coating material thereon; and a metering mechanism adjacent to the coating roll to control the thickness of the coating material on the coating roll to be transferred to the patterned surface structure of the substrate;

wherein the coating material is transferred from the coating roll to the substrate at the nip to form a coating pattern covering the peaks of the patterned surface structure of the substrate.

Embodiment 16 is the roll coating system of embodiment 15, wherein the metering mechanism comprises a reverse metering roll to engage with the coating roll, the reverse metering roll and the coating roll spinning in a same direction.

Embodiment 17 is the roll coating system of embodiment 16, wherein the coating roll and the reverse metering roll are positioned such that an engagement depth therebetween is controlled to adjust a thickness of the coating material on the coating roll to be transferred to the major surface of the substrate at the nip.

Embodiment 18 is the roll coating system of any one of embodiments 15-17, wherein the coating roll and the back-up roll are positioned to adjust at least one of a coating thickness, a coating conformability, or a coating coverage of the coating material on the major surface of the substrate.

Embodiment 19 is the roll coating system of any one of embodiments 15-18, wherein the array of structures has a characteristic height about 10 to about 500 micrometers, and the coating material is coated conformal to the peaks of the structures.

Embodiment 20 is the roll coating system of any one of embodiments 15-19, wherein the deformable inner layer of the coating roll has a hardness less than that of the deformable outer layer of the coating roll.

Embodiment 21 is the roll coating system of any one of embodiments 15-20, wherein the deformable inner layer of the coating roll has a hardness less than 40 Shore A, less than 20 Shore A, optionally less than 10 Shore A.

Embodiment 22 is the roll coating system of any one of embodiments 15-21, wherein the deformable outer layer of the coating roll has a hardness greater than about 40 Shore A, optionally greater than about 50 Shore A.

Embodiment 23 is the roll coating system of any one of embodiments 15-22, wherein the inner layer of the coating roll has a compressibility of less than about 45 psi at 25% deflection, optionally less than about 20 psi at 25% deflection.

Embodiment 24 is the roll coating system of any one of embodiments 15-23, wherein the inner layer of the coating roll has a Poisson's ratio of less than 0.3, less than 0.2, optionally, less than 0.1.

Embodiment 25 is the roll coating system of any one of embodiments 15-24, wherein the deformable outer layer includes one or more materials of an elastomer, a metal, a fabric, or a nonwoven.

Embodiment 26 is the roll coating system of any one of embodiments 15-25, wherein the deformable inner layer includes one or more materials of a synthetic foam, an engraved, structured, 3D printed, or embossed elastomer, a fabric or nonwoven layer, a plurality of cavities filled with gas of a controlled pressure, or a soft rubber.

Embodiment 27 is the roll coating system of any one of embodiments 15-26, wherein the back-up roll is a rigid roll or optionally, a rigid roll covered with a deformable layer.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Roll Coating System: Examples and Comparative Examples

The coating configuration of roll coating systems illustrated in FIG. 1 was set-up. To make the Comparative Example, the back-up roll was a 90 mm diameter steel roll; the coating or "C" roll was a 120 mm diameter, 65 shore A durometer 11" shouldered rubber roll, or a 120 mm diameter, 15" wide coating roll with a 0.050" urethane skin and 0.148" foam layer, and the reverse metering roll was a 120 mm diameter steel roll. To make the Example, the back-up roll was a 90 mm diameter steel roll; the coating roll was a 120 mm diameter, 15" wide coating roll with a 0.050" urethane skin and 0.148" foam layer, and the reverse metering roll roll was a 120 mm diameter steel roll. For each of the Comparative Example and Example, a catch pan was placed under the three rolls so that both the B and C rolls could be dipped into a resin that was pumped into the pan with a Watson Marlow 630 Du peristaltic pump with a 620L twin-channel pump head. The reverse metering roll had a 1½" width, 0.025" thick, 13° bevel Esterlam E600 composite doctor blade. The blade was positioned to skive off material so that as the coating roll spins counter-clockwise and the metering roll spins counter-clockwise, the material was skived off of the metering roll before it could enter the coating nip. The three rolls spun in the directions indicated in FIG. 1 and final coating thicknesses were controlled by adjusting both the engagement depth between the back-up roll and the coating roll as well as the engagement depth between the metering roll and the coating roll.

Various Examples and Comparative Examples are prepared on a substrate having a patterned surface structure similar to the configuration in FIG. 3. The coat weights are varied as metered by the reverse metering roll. Also, the engagement depth between the coating roll and the back-up roll (i.e., engagement depth D2) and the engagement depth between the coating roll and the metering roll (i.e., engagement depth D1) are varied to determine their respective effects on the coating material thickness.

It is found that using the coating configuration for the Examples provides a larger process window and better control over conformability to the pattered substrate surface. When the coating weight at a certain low level, the Examples show better conformability to the patterned substrate surface as compared to the Comparative Examples, while the Comparative Examples show undercoating on the patterned surface structure of the substrate where the coating may not fully cover the top surfaces or peaks of the patterned surface structure. When the coating weight at a certain high level, the Examples show better conformability only to the peaks of the patterned substrate surface as compared to the Comparative Examples, while the Comparative Examples show overcoating on the patterned substrate surface where the coating not only covers the peaks but also goes down into the gaps, openings, or troughs between the peaks.

Figure 4A:
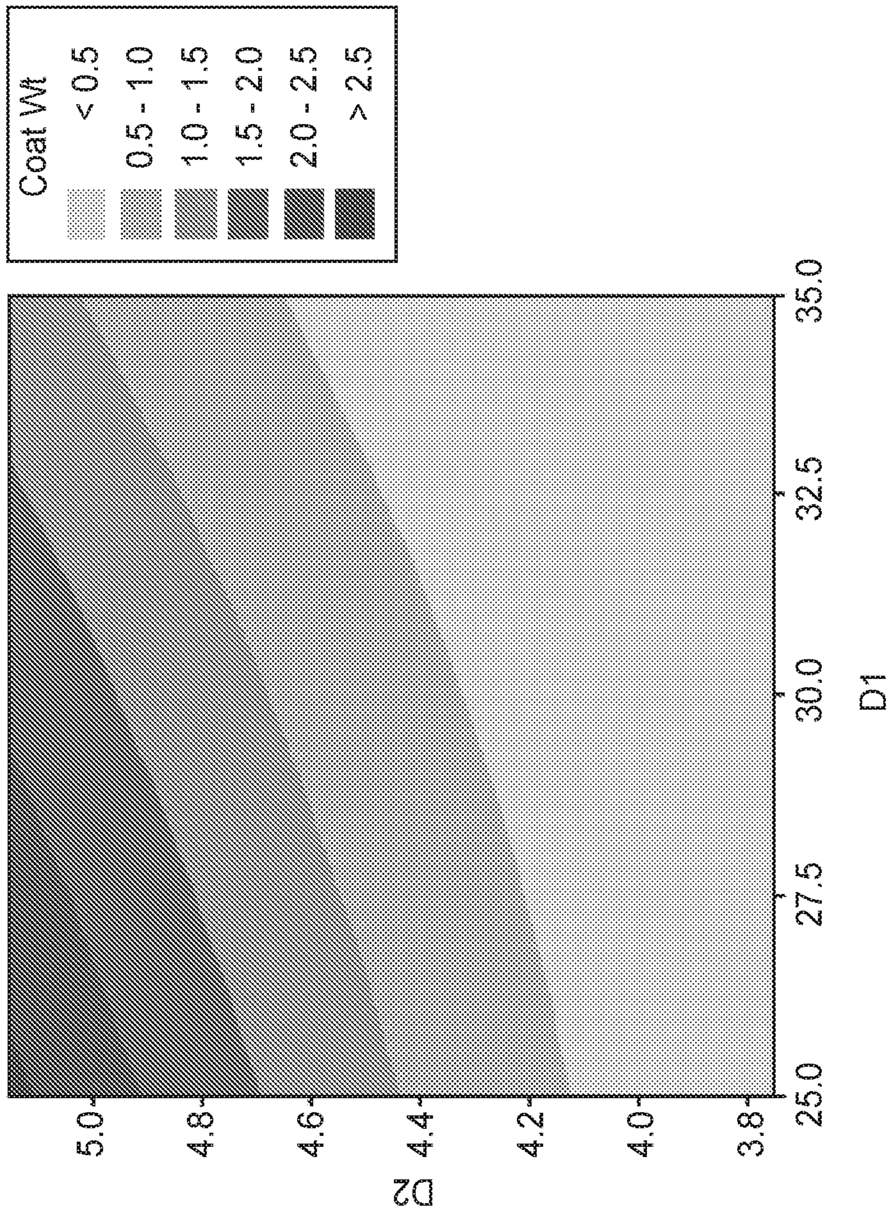
FIG. 4A is contour plots of the coating weight of the coating material on the structured substrate surface for the Comparative Examples.
Figure 4B:
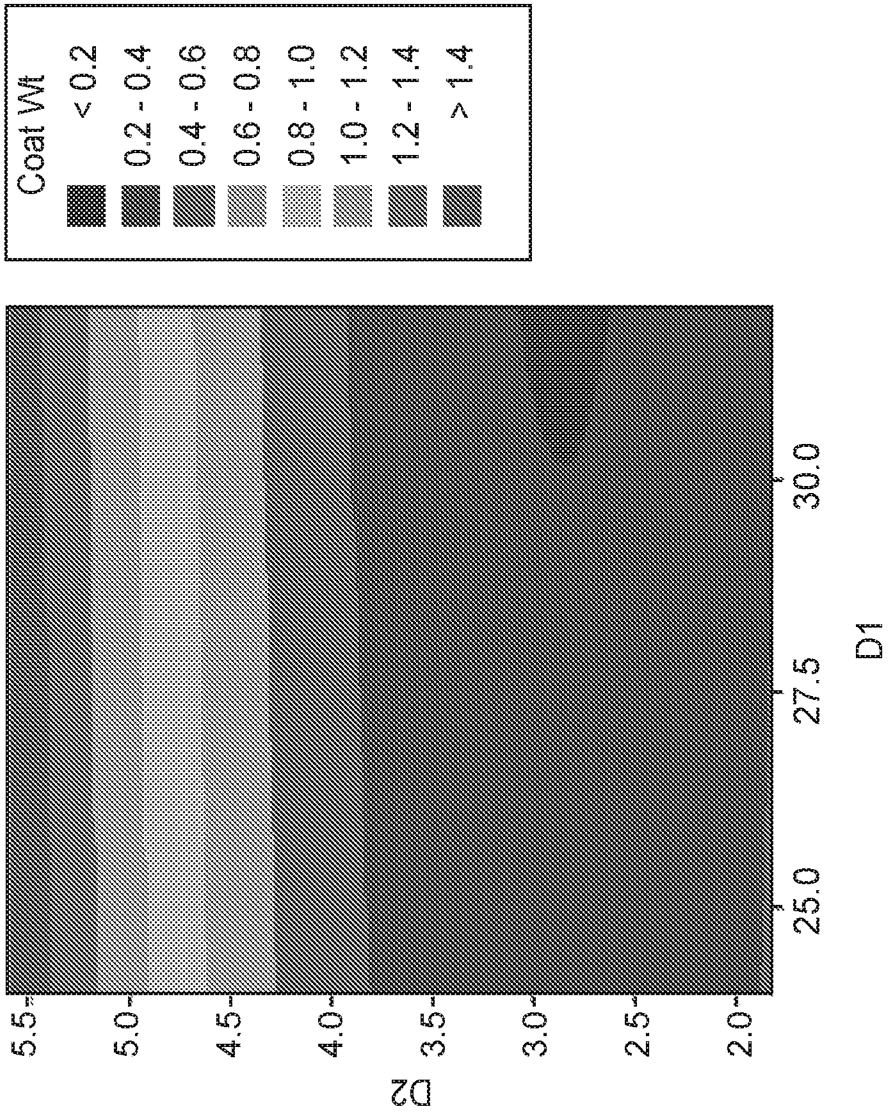
FIG. 4B is contour plots of the coating weight of the coating material on the structured substrate surface for the Examples.

In addition, contour plots of the coating weight of the coating material on the structured substrate surface are made in FIGS. 4A-B for the Comparative Examples and the Examples, respectively. The plots show that for the Comparative Examples there is a correlation between the coating weight and both the engagement depths D1 and D2, while the same plot with the Examples shows much less correlation between the coating weight and the engagement depth D1 as compared to the engagement depth D2. This finding allows for control of the coating weight via the engagement depth D2, while the engagement depth D1 can be used to control the coverage or uniformity of the coating on the patterned surface structure of the substrate.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Various exemplary embodiments have been described. These and other embodiments are within the scope of the following claims.

What is claimed is:

1. A method of coating a patterned structure on a substrate, the method comprising:

providing a coating roll having a deformable inner layer with a surface thereof covered by a deformable outer layer, the inner layer being softer than the outer layer;

providing a back-up roll engaging the coating roll to form a nip therebetween;

providing a substrate to enter the nip and wrap around the back-up roll, the substrate comprising a patterned surface structure on a major surface facing the coating roll, the patterned surface structure including an array of structures having peaks projecting from a base plane of the substrate and troughs formed between the adjacent structures;

metering a coating material on the coating roll to be transferred to the major surface of the substrate at the nip, wherein metering the coating material comprises providing a reverse metering roll to engage with the coating roll, the reverse metering roll and the coating roll spinning in the same direction, and controlling an engagement depth between the coating roll and the reverse metering roll to adjust a coating weight of the coating material on the patterned surface structure;

transferring a coating material from the coating roll to the substrate at the nip to form a coating pattern covering the peaks of the patterned surface structure of the substrate, and controlling an engagement depth between the coating roll and the back-up roll to control the conformability of the coating material to the peaks of the array of structures.

2. The method of claim 1, wherein the array of structures has a characteristic height of 10 to 500 micrometers, and the coating material is coated conformal to the peaks of the structures.

3. The method of claim 1 wherein the deformable inner layer of the coating roll has a hardness less than that of the deformable outer layer of the coating roll.

4. The method of claim 3, wherein the deformable inner layer of the coating roll has a hardness less than 20 Shore A and wherein the deformable outer layer of the coating roll has a hardness greater than 50 Shore A.

5. The method of claim 1, wherein the inner layer of the coating roll has a compressibility of less than 45 psi at 25% deflection and a Poisson's ratio of less than 0.3.

* * * * *